United States Patent
Bambos et al.

(10) Patent No.: US 7,634,287 B1
(45) Date of Patent: Dec. 15, 2009

(54) POWER CONTROLLED MULTIPLE ACCESS (PCMA) IN WIRELESS COMMUNICATION NETWORKS

(75) Inventors: Nicholas Bambos, San Mateo, CA (US); Sunil Kandukuri, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1071 days.

(21) Appl. No.: 10/011,116

(22) Filed: Nov. 13, 2001

Related U.S. Application Data

(60) Provisional application No. 60/249,118, filed on Nov. 15, 2000, provisional application No. 60/257,680, filed on Dec. 22, 2000.

(51) Int. Cl.
*G06F 15/16* (2006.01)
(52) U.S. Cl. .................................. 455/522; 455/63.1
(58) Field of Classification Search .............. 455/507, 455/509, 517, 522, 524, 526, 63.1, 67.13, 455/561, 127.1, 127.2, 127.5, 114.2, 105; 370/235, 330, 337
See application file for complete search history.

(56) References Cited

U.S. PATENT DOCUMENTS

| | | | |
|---|---|---|---|
| 6,321,081 B1 * | 11/2001 | Lee | 455/522 |
| 6,374,117 B1 * | 4/2002 | Denkert et al. | 455/522 |
| 6,456,605 B1 * | 9/2002 | Laakso et al. | 370/337 |
| 6,782,277 B1 * | 8/2004 | Chen et al. | 455/562.1 |
| 2002/0198015 A1 * | 12/2002 | Becker et al. | 455/522 |

OTHER PUBLICATIONS

G.J. Foschini and Z. Miljanic. "A simple distributed autonomous power control algorithm and its convergence". IEEE Tran. On Veh. Tech., 42(4):641-646, 1993.
R. Yates. "A framework for uplink power control in cellular radio systems". IEEE. Sel. Areas in Comm., 13(7):1341-1347 (1995).

* cited by examiner

*Primary Examiner*—Sam Bhattacharya
(74) *Attorney, Agent, or Firm*—Crawford Maunu PLLC

(57) ABSTRACT

An approach for managing data transmissions from multiple sources using a common channel addresses the problem of interference caused by two or more sources transmitting simultaneously. In one embodiment, the communication system provides a state of the channel, for example, an indication of the recent or current channel state such as interference level. Before transmitting, a transmitter station buffers blocks of data and selects a transmission mode for use in transmitting at least one of the buffered data blocks as a function of the buffered data sets and the indication of the recent channel state (interference). More specific embodiments are directed to, among other aspects, use of algorithms for evaluating the channel state and processing the transmissions using various types of transmission modes including, for example, setting the power level, modulation scheme, access point, coding scheme, and combinations of these adjustable parameters.

33 Claims, 3 Drawing Sheets ical systems and methods and, more particularly, to systems and methods for processing of packetized data in network environments including, for example, wireless networks.

POWER CONTROLLED MULTIPLE ACCESS (PCMA) IN WIRELESS COMMUNICATION NETWORKS

RELATED PATENT DOCUMENTS

This patent document claims the benefit, under 35 U.S.C. § 119(e), of U.S. Provisional Application Ser. No. 60/249,118, filed on Nov. 15, 2000, and Ser. No. 60/257,680, filed on Dec. 22, 2000.

FIELD OF THE INVENTION

The present invention relates generally to data communication systems and methods and, more particularly, to systems and methods for processing of packetized data in network environments including, for example, wireless networks.

BACKGROUND OF THE INVENTION

Controlling the transmitter powers in wireless communication networks provides multiple benefits. It allows interfering links sharing the same radio channel to achieve required quality of service (QoS) levels, minimizing the power spent in the process and extending the battery life of mobile users. Moreover, by judiciously using power to achieve their QoS goals, interference is mitigated and the network capacity increases. The benefits of power control have attracted substantial research attention. Most of the research, however, has focused on voice-oriented 'continuous' traffic, which is dominant in current generation wireless networks.

Next generation wireless networks are currently being designed to support intermittent packetized data traffic, beyond the standard voice-oriented continuous one. Such support is needed for the delivery of sophisticated information services over tetherless wireless channels (for example, Web browsing on a mobile laptop computer). The problem of power control in this new environment of packetized data traffic is not well understood. Early preliminary studies have not addressed several important aspects of the problem.

The transmitter faces the following problem in controlling its power. When the transmitter observes high interference in the channel, it recognizes that it will have to spend a lot of power (actually energy) to overcome the interference and transmit a packet successfully to the receiver. Therefore, it would be better to back off, buffer the traffic and wait for the interference to subside before it transmits to clear the buffer. However, as it has backed off, the buffer is filling up with new packet arrivals and delay rises, which pushes the transmitter to become power-aggressive in order to reduce its backlog. There are many transmitters sharing the channel, each one observing only its local interference (at its intended receiver) and its backlog level. The interference is responsive to transmitter actions. Indeed, a power-aggressive transmitter may cause some other to go into a backoff mode or become also aggressive. For voice-oriented continuous traffic the previous situation cannot be a dominant one, since only minimal 'elastic' buffering can be tolerated due to the delay-sensitive nature of the traffic.

SUMMARY

Various embodiments of the present invention are directed to overcoming the above mentioned deficiencies and to power controlled shared channel access in wireless networks supporting packetized channel traffic beyond the voice-oriented continuous traffic primarily supported by current generation networks.

Other embodiments of the present invention are directed to approaches for managing data transmissions from multiple sources using a common channel (or overlapping channels) to alleviate the problem of interference caused by two or more sources transmitting simultaneously. In one more specific embodiment, for example, the communication system provides a state of the channel, for example, an indication of the recent or current channel state such as interference level. Before transmitting, a transmitter station buffers blocks of data and selects a transmission mode for use in transmitting at least one of the buffered data blocks as a function of the buffered data sets and the indication of the recent channel state (interference). Other more specific embodiments are directed to, among other aspects, use of algorithms for evaluating the channel state and processing the transmissions using various types of transmission modes including, for example, setting the power level, modulation scheme, access point, coding scheme, and combinations of these adjustable parameters.

Other aspects of the invention are directed to PCMA protocols for autonomous channel access in high-performance wireless networks, and to methods, systems and components in such systems operating consistent with the above approaches for managing data transmissions from multiple sources.

The above summary is not intended to characterize every aspect, or each embodiment, contemplated in connection with the present invention. Other aspects and embodiments will become apparent from the discussion in connection with the figures which are introduced below and the detailed description of the various embodiments.

BRIEF DESCRIPTION OF THE DRAWINGS

Various aspects and advantages of the present invention will become apparent upon reading the following detailed description of various embodiments and upon reference to the drawings in which.

in (40) for $i\epsilon[0,1000]$, where $\delta=1$ and I=1000, for different values of X=200, 400, 600, 800, 1000, 1500, 2000, 2500, 3000, 3500 correspondingly (the lowest curve is for X=200 and the highest for X=3500).

Figure 4:
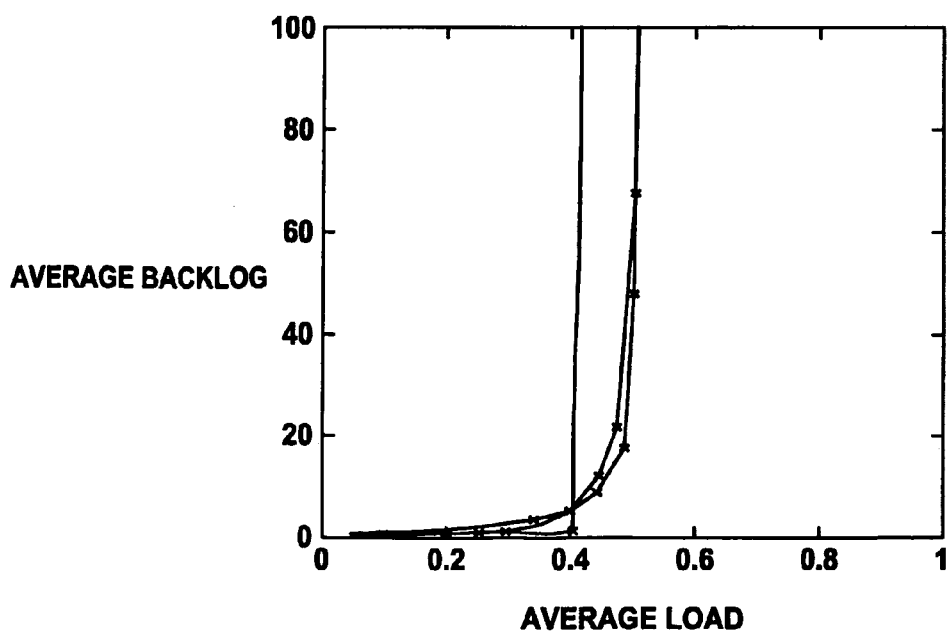

FIG. 4 shows plots of the average backlog vs. average load (arrival rate $\lambda$) performance curves for a wireless network topology (see text) operating under the three power control algorithms: 1) Constant-SIR (vertical bar marks) 2) PCMA-1 (asterisk marks) and 3) PCMA-2 (cross marks). Note that the maximal throughput of Constant-SIR is about 4.1, while both PCMA-1 and PCMA-2 show a maximal throughput of about 5.2, that is, a 20% improvement over Constant-SIR.

Figure 5:
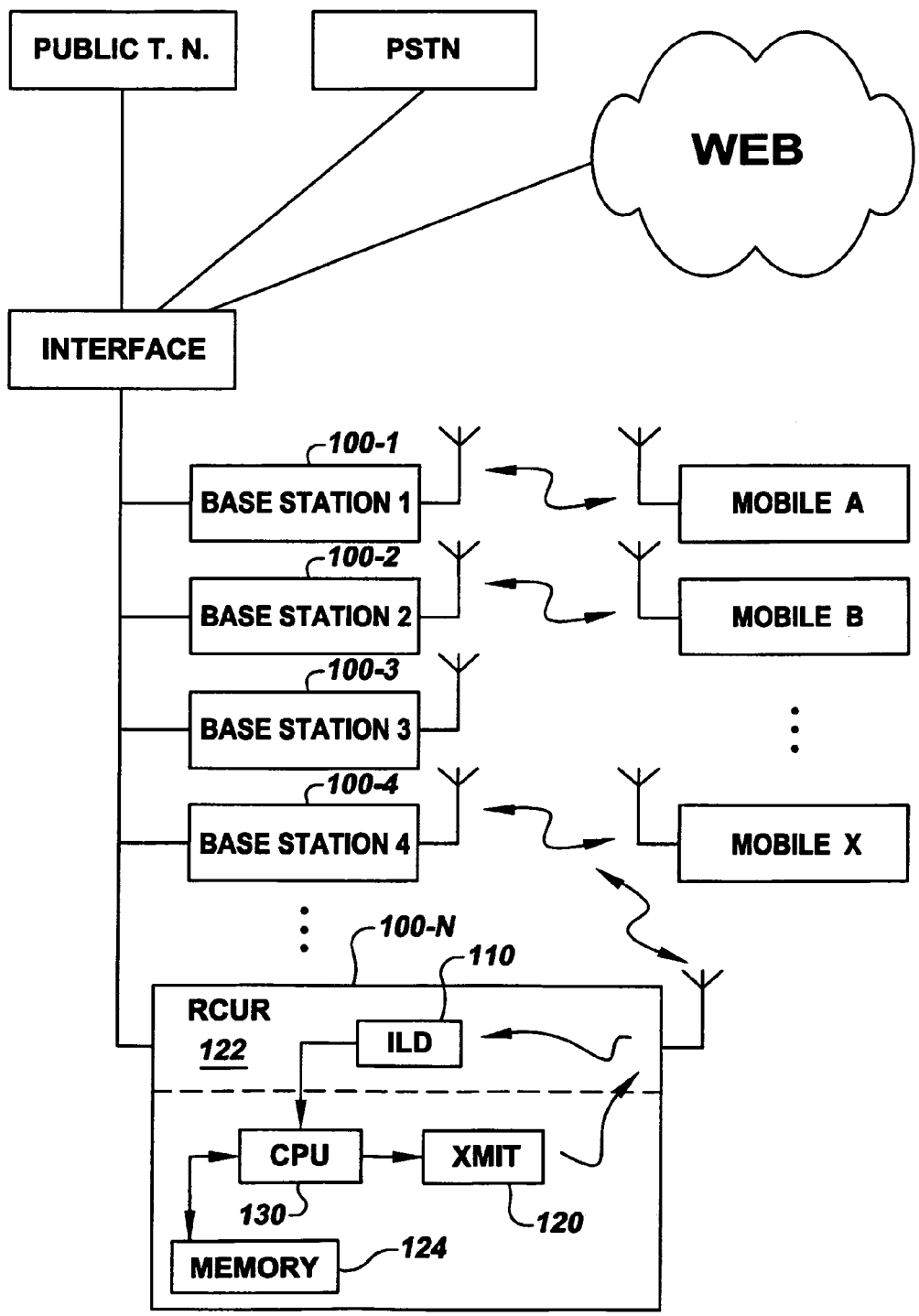

FIG. 5 is an example embodiment of a system, according to the present invention, for managing data transmissions from multiple sources using a common channel (or overlapping channels) to alleviate the problem of interference caused by two or more sources transmitting simultaneously.

While the invention is amenable to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION

The present invention is believed to be applicable to a variety of systems and methods that communicate data blocks (sometimes known as "packets" depending on the application) in a communication environment that is susceptible to interference from neighboring packet transmissions. In connection with wireless LAN communications systems, for example, multiple transmitters in the system transmit data packets at approximately the same time on a common channel or nearby channels. An appreciation of the invention may be ascertained through the following discussion in the context of such example applications, in which those skilled in the art will appreciate that reference to a "data block" or "packet" is not necessarily limited to a data set having a size that is fixed.

A first example embodiment of the present invention is directed to a wireless LAN communications system coupled, for example, to the Internet and related terminals. FIG. 5 illustrates this type of system. In various embodiments, one or more of the illustrated base stations 110-1 through 110-N of FIG. 5 include: a first data processing block adapted to provide an indication of recent state for the channel; a second data processing block adapted to buffer blocks of data for subsequent transmission; and a third data processing block adapted to select a transmission mode for use in transmitting at least one of the buffered data blocks as a function of the buffered data sets and the indication of the recent channel state. The recent channel state can correspond to the interference level in the system, for example, via an interference level detection block (ILD 110). Before transmitting, the base station (which includes a transmitter 120 and in some applications also includes a receiver 122 for receiving data from the mobiles) buffers blocks of data, for example, in memory 124 and the base station's processor (e.g., 130), and selects a transmission mode for use in transmitting at least one of the buffered data blocks as a function of the buffered data sets and the indication of the recent channel state (interference). As described later and in the attached Appendices A and B, other more specific embodiments are directed to, among other aspects, use of algorithms for evaluating the channel state and processing the transmissions using various types of transmission modes including, for example, setting the power level, modulation scheme, access point, coding scheme, and combinations of these adjustable parameters.

In reviewing the following discussion, this system example may be referred to for an understanding of one or many example applications of the present invention.

Using for example the framework of Dynamic Programming or Bellman's principle of optimality, a single communication link operating in a channel with a random (i.i.d. or Markovian) interference is addressed, according to one aspect of the invention by efficiently channel-sharing based on algorithms that employ selection of channel-related parameters such as power level, modulation scheme, access point, and a coding scheme. Various embodiments of the present invention are directed to a number of progressively more-complicated formulations of the power control problem, incorporating various relevant operations costs (power, delay, packet loss, deadlines, etc.) which typically map to the link's quality of service and turn out to be important in practice.

It is assumed that the interference environment is non-responsive; that is, the interference does not react to changes in transmission power and is insensitive to transmitter actions. In essence, the power control problem is for a single link in a channel with randomly modulated interference. This approach is readily extended for the more realistic case of multiple links in the channel, interfering with each other. This is the case of "responsive" interference as is discussed below.

A. Optimally Emptying the Transmitter Buffer Under i.i.d. Interference—Static Formulation Consider a communication link operating in slotted time, indexed by $\eta \in \{1, 2, 3, \ldots\}$. the transmitter is equipped with a FIFO queue (buffer) which initially holds K packets, indexed by $k \in \{1, 2, 3, \ldots K\}$. Packet 1 is that at the head of the queue and packet K at the tail. Packets are transmitted over a channel of random interference. Let $i_n$ be the interference during the $n^{th}$ time slot. This stays constant during each time slot, but fluctuates randomly in different ones. Let us assume that the random variables $i_n$ are independent in different time slots and identically distributed over the interval [0,I] with distribution density f(i). For example, they could be uniformly distributed over [0,I].

Let $p_n$ be the power that the transmitter uses to transmit a packet during the $n^{th}$ time slot. If the channel interference is i and power p is used to transmit a packet in a time slot, then that is successfully received at the receiver with probability s(p,i). Packet transmission events are statistically independent of each other. Upon successful transmission, the packet is immediately removed from the queue and the transmitter attempts to transmit the next one in the queue. In case of unsuccessful transmission, the transmitter continues to attempt transmission of the same packet in the following time slots, until this is successfully transmitted. We assume that the transmitter is immediately notified at the end of each slot, whether the packet transmitted in that slot was successfully received or not, through some highly reliable ACK/NACK process which takes negligible time. Finally, we denote by $b_n$ the backlog (number of packets in the transmitter queue) in the $n^{th}$ time slot. Assume that the transmitter first estimates the interference $i_n$ at the beginning of the $n^{th}$ time slot, then selects a power $p_n$ to transmit the head packet, and if successful, removes the packet from the queue at the end of the current time slot.

The issue is to choose the power $p_n$ at which to transmit the head packet given: 1) the current interference level $i_n$ and, 2) the current backlog $b_n$. In each time slot n the system incurs a cost that has two components: the power cost $p_n$, that refers to the power (actually energy) spent in the slot; and the backlog cost $B(b_n)$, where B( ) is an increasing, positive function of the number of packets in the buffer.

The system is allowed to evolve up to time N and is then stopped at the beginning of slot N+1, incurring a terminal cost $T(b_{N+1})$ which is a positive, increasing function of the packets that have been left in the buffer. The overall cost of the problem is the sum of all the individual costs incurred in the time slots plus the terminal one. The objective is to minimize the average overall cost by controlling the powers $\{p_1, p_2, \ldots p_n, \ldots p_N\}$ in consecutive time slots; that sequence is the power control applied.

The above formulation of the problem is within the general framework of dynamic programming. Recalling that the interference is i.i.d. in different time slots, let $J_n(b)$ be the average cost-to-go at time n, that is, the minimal expected cost that would be incurred under optimal power control, if the system were to evolve from time n to N, starting at time n with b jobs in the queue. The standard dynamic programming recursion satisfied by $J_n(b)$ becomes in this case:

$$J_n(b) = \inf_p \int_0^I \{p + B(b) + s(p,i)J_{n+1}(b-1) + (1-s(p,i))J_{n+1}(b)\} f(i) di \quad (1)$$

where f(i) is the density of the i.i.d. interference. Indeed, note that the immediately incurred cost is p+B(b), and with probability s(p,i) a packet will depart and the future cost-to-go will be $J_{n+1}(b-1)$, while with probability (1−s(p,i)) no packet will depart and the future cost-to-go will be $J_{n+1}(b)$. Rearranging the terms, we get $$J_n(b) = \inf_p \int_0^I \{p - s(p,i)(J_{n+1}(b) - J_{n+1}(b-1)) + [B(b) + J_{n+1}(b)]\} f(i) di, \quad (2)$$

for every $1 \leq n \leq N$, $0 \leq b \leq K$. We naturally expect that $J_{n+1}(b) - J_{n-1}=(b-1) \geq 0$ for every backlog level b and time n, since starting with a higher backlog should result at a higher cost. The terminal cost is $J_{N+1}(b)=T(b)$. Obviously, $J_n(0)=0$ for every n. Solving this family of recursive equations, we obtain the optimal power control $\{p^*_1, p^*_2, \ldots p^*_n, \ldots p^*_N\}$, which results in the minimum cost $J_1(K)$—that is, the minimum overall cost.

Dynamic programming recursions can rarely be solved analytically. Fortunately, in this case (due to the special structure of the problem), we can obtain (semi)analytical solutions which provide significant insight into the power control problem. Of particular value is the case of i.i.d. interference which is uniformly distributed in [0,I]—this captures well the essence of the problem and leads to 'clean' solutions.

To specify s(p,i), the probability of successful transmission, we note that it is typically a function of $$\frac{p}{i}$$

—the SIR (signal-to-interference ratio). A natural functional form, arising in some standard radio technologies, is simply:

$$s(p,i) = \frac{p}{\alpha p - \beta i} = \frac{\frac{p}{i}}{\alpha \frac{p}{i} + \beta} \quad (3)$$

with $\alpha \geq 1$ and $\beta > 0$ (which guarantee that $s(p,i) \leq 1$). Using this function below, the analysis is generalized to other forms in section II-D. For simplicity p is unconstrained for the moment and the power-constrained case is addressed later in section II-C. The dynamic programming recursion (2) now becomes $$J_n(b) = \inf_p \int_0^I \left\{ p - \frac{p}{\alpha p + \beta i} X_n(b) + Y_n(b) \right\} f(i) di, \quad (4)$$

with $$X_n(b) = J_{n+1}(b) - J_{n+1}(b-1)$$

$$Y_n(b) = B(b) + J_{n+1}(b). \quad (5)$$

Note that $Y_n(b) - X_n(b) = B(b) + J_{n+1}(b-1) \geq 0$ for all n's and b's. We can solve the recursions using the following lemma.

Lemma 1:

$$p^*(i) = \begin{cases} \frac{1}{\alpha}(\sqrt{\beta X i} - \beta i), & i < \frac{X}{\beta} \\ 0, & i \geq \frac{X}{\beta}. \end{cases} \quad (6)$$

minimizes the functional $$F_{XY}(i) = \inf_p \left\{ p - \frac{p}{\alpha p + \beta i} X + Y \right\}, \quad (7)$$

which attains the minimal value $$F_{XY}(i) = \begin{cases} \frac{1}{\alpha}(2\sqrt{\beta X i} - \beta i - X) + Y, & i < \frac{X}{\beta} \\ Y, & i \geq \frac{X}{\beta}, \end{cases} \quad (8)$$

and is $F_{XY}(i) \geq 0$ for every $i \in [0,I]$. Moreover, for an arbitrary distribution $f(i) \geq 0$ on [0,I], the power function (6) minimizes also the functional $$\Phi\{X < Y\} = \inf_p \int_0^I \left\{ p - \frac{p}{\alpha p + \beta i} X + Y \right\} f(i) di, \quad (9)$$

which attains the value $$\Phi\{X,Y\} = \int_0^I F_{XY}(i) f(i) di \quad (10)$$

In particular, if i is uniformly distributed on [0,I] (hence, $f(i) = \frac{1}{I}$) the minimum value of the functional (9) is $$\Phi_a\{X,Y\} = \begin{cases} \frac{5X^2}{6\alpha\beta I} + Y - \frac{X}{\alpha}, & I \geq \frac{X}{\beta} \\ \frac{\sqrt[4]{\beta X I}}{3\alpha} - \frac{\beta I}{2\alpha} + Y - \frac{X}{\alpha}, & I < \frac{X}{\beta} \end{cases} \quad (11)$$

and the average power $\int_0^I p^*(i) f(i) di$, under uniform interference $f(i) = \frac{1}{I}$ is simply $$p^*_{avg} = \begin{cases} \dfrac{X^2}{6\alpha\beta I} & I \geq \dfrac{X}{\beta} \\ \dfrac{\sqrt[3]{\beta X I}}{3\alpha} - \dfrac{\beta I}{2\alpha} & I < \dfrac{X}{\beta}. \end{cases} \quad (12)$$

Proof: The p*(i) is obtained through standard differentiation for minimizing $$p - \dfrac{p}{\alpha p + \beta i} X + Y.$$

The rest are obtained through standard calculations. The $\Phi\{X,Y\}$ is minimized via point-wise minimization, due to its special form. We spare the details for the journal version of this paper.

Figure 1:
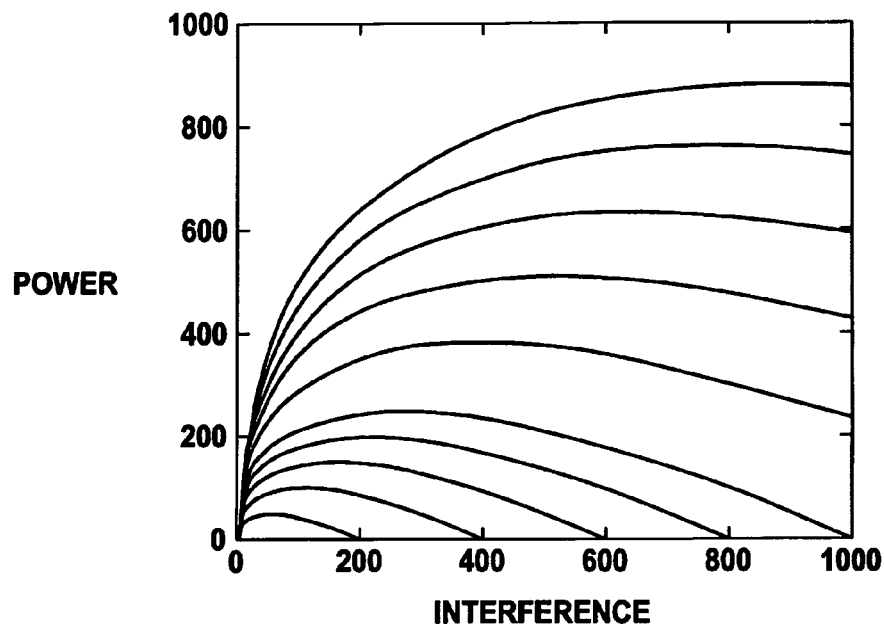
FIG. 1 shows plots of the power function $p^*(i)=\sqrt{(Xi)}-i, i\epsilon[0,1000]$ of (6), for $\alpha=\beta=1$ and I=100, for various values of X=200, 400, 600, 800, 1000, 15000, 25000, 3000, 35000 correspondingly (the lowest curve is for X=200 and the highest for X=3500). This is the same for any distribution of the random interference.
Figure 2:
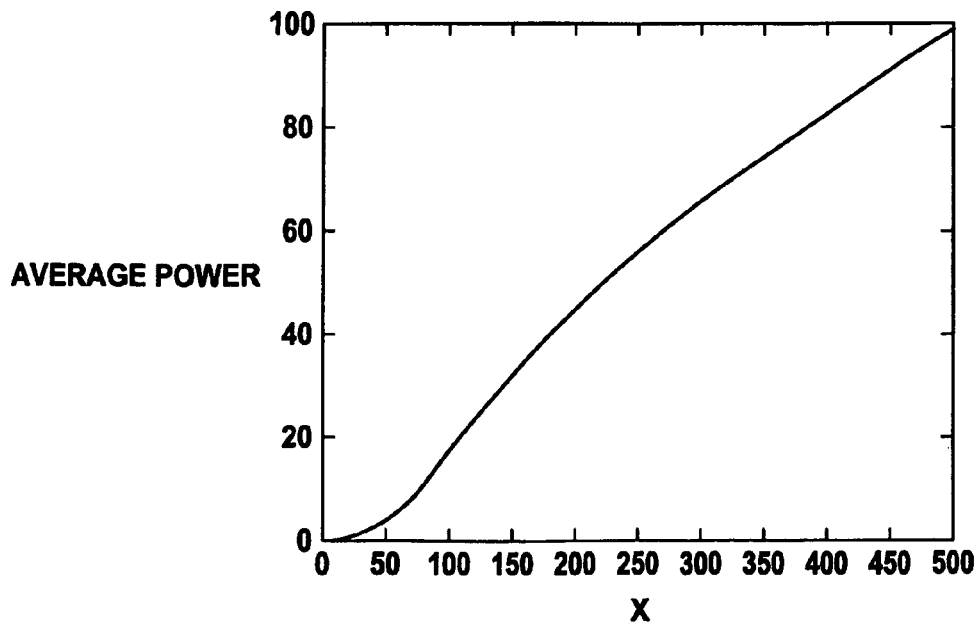
FIG. 2 is a plot of the average power function $p^*_{avg}$ of (12), as a function of X, for $\alpha=\beta=1$ and I=100. This is specific to uniform interferences in [0,100].

Example: It is interesting to observe the FIG. 1 which shows a family of optimal power functions p*(i) for various values of X. Note that, in general, p*(i) has an increasing phase (aggressive), followed by a decreasing one (soft backoff), and then by a zero power one (hard backoff). We will see that is a ubiquitous behavior with important practical design consequences. The average power for uniform interference is shown in FIG. 2.

Using Lemma 1, we can now solve the dynamic programming recursion (4) to obtain the optimal power control in various time slots $\{p^*_1(i,b), p^*_2(i,b), \ldots p^*_n(i,b), \ldots p^*_N(i,b)\}$ by $$p_n^*(i,b) = \begin{cases} \dfrac{1}{\alpha}(\sqrt{\beta X_n(b) i} - \beta i) & i < \dfrac{X_n(b)}{\beta} \\ 0 & i \geq \dfrac{X_n(b)}{\beta} \end{cases} \quad (13)$$

where the $\{X_n(b)\}$'s are calculated recursively (backwards from N to 1) as follows:

$$X_n(b) = \Phi\{X_{n+1}(b), Y_{n+1}(b)\} - \Phi\{X_{n+1}(b-1), Y_{n+1}(b-1)\} \quad (14)$$

$$Y_n(b) = B(b) + \Phi\{X_{n+1}(b), Y_{n+1}(b)\} \quad (15)$$

for $n \in \{N, N-1, N-2, \ldots 3, 2, 1\}$, starting with $X_N(b)=T(b)-T(b-1)$ and $Y_N(b)=B(b)+T(b)$. This is easy to see from (5) and (10). For the special case of uniform interference, we simply use $\Phi_u$ given by the analytic formula (11).

Remark: Note that in p*(i,b) of (13) the backlog b enters through the $X_n(b)$ alone. Naturally, $X_n(b)$ is an increasing function of b, generating a family of power curves analogous to that of FIG. 1. We return to this point later.

Remark: In practice, we can take the backlog cost to be linear B(b)=b and the terminal cost to be quadratic or of higher power T(b)=$b^\gamma$. The higher the γ the more severe the terminal cost is going to be, so the system should spend more power to increase the probability that very few packets will remain in the queue at the end of the process at time N.

B. Incorporating Packet Arrivals and Buffer Overflows—Dynamic Formulation

The previous formulation of the power control problem does not include the possibility of packet arrival in each time slot. However, this can be easily incorporated into the model as follows. Assume that at the beginning of each time slot a packet may arrive with probability $\lambda \in (0,1)$ or no packet arrives with probability $1-\lambda$. Arriving packets join the queue at its tail. Each arrival event is assumed to be statistically independent from any other random events in the system (transmissions, interference, other arrivals). The queue is assumed to have total capacity Q. When a packet finds the buffer full it is blocked/rejected and a loss cost L is incurred. Otherwise, the system is identical as before (in terms of costs) and is run for N steps also.

Let $J'_n(b)$ be the expected cost-to-go in this case. To structure the dynamic programming equations below we need to order the events as follows. At the very beginning of each time slot the backlog state b is registered, which includes the packet which may have just arrived (packets can arrive only at the beginning of each slot). A packet which is successfully transmitted in a slot is removed from the queue at the end of the slot, so its removal is registered in the backlog state at the very beginning of the next slot. By considering the possible state transitions of the system, it is easy to see that:

$$J'_n(Q) = \inf_p \int_0^I \{p + \lambda[B(Q) + L + (1 - s(p,i))J'_{n+1}(Q) + \quad (16)$$
$$s(p,i)J'_{n+1}(Q-1)] + (1-\lambda)[$$
$$B(Q) + (1-s(p,i))J'_{n+1}(Q) + s(p,i)J'_{n+1}(Q-1)]\}f(i)di$$

$$J'_n(b) = \quad (17)$$
$$\inf_p \int_0^I \{p + \lambda[B(b+1) + (1-a(p,i))J'_{n+1}(b+1) + a(p,i)J'_{n+1}(b)] +$$
$$(1-\lambda)[B(b) + (1-s(p,i))J'_{n+1}(b) +$$
$$s(p,i)J'_{n+1}(b-1)]\}f(i)di$$

$$J'_n(0) = \inf_p \int_0^I \{p + \lambda[B(1) + (1-s(p,i))J'_{n+1}(1) + s(p,i)J'_{n+1}(0)] + \quad (18)$$
$$(1-\lambda)[B(0) + J'_{n+1}(0)]\}f(i)di \quad (19)$$

where 0<b<Q. Rearranging the terms we get $$J'_n(Q) = \inf_p \int_0^I \{p - s(p,i)X'_n(Q) + Y'_n(Q)\}f(i)di, \quad (20)$$

where $$X'_n(Q) = J'_{n+1}(Q) - J'_{n+1}(Q-1) \quad (21)$$

$$Y'_n(Q) = B(Q) + \lambda L + J'_{n+1}(Q), \quad (22)$$

and for 0<b<Q $$J'_n(b) = \inf_p \int_0^I \{p - \partial(p,i)X'_n(b) + Y'_n(b)\}f(i)di, \quad (23)$$

where $$X_n(b) = \lambda[J'_{n+1}(b+1) - J'_{n+1}(b)] + (1-\lambda)[J'_{n+1}(b) - J'_{n+1}(b-1)] \quad (24)$$

$$Y_n(b) = \lambda[B(b+1) + J'_{n+1}(b+1)] + (1-\lambda)[B(b) + J'_{n+1}(b)] \quad (25)$$

and $$J'_n(0) = \inf_p \int_0^I \{p - s(p,i)X'_n(0) + Y'_n(0)\}f(i)\,di, \quad (26)$$

where $$X'_n(0) = \lambda[J'_{n+1}(1) - J'_{n+1}(0)] \quad (27)$$

$$Y'_n(0) = \lambda B(1) + (1-\lambda)[B(0) + J'_{n+1}(0)] \quad (28)$$

Observe that when we substitute $$s(p,i) = \frac{p}{\alpha p + \beta i}$$

the previous formulas take the form of (9) and satisfy the assumptions of Lemma 1, so the optimal power control sequence $\{p^*_1(i,b), p^*_2(i,b), \ldots p^*_n(i,b), \ldots p^*_N(i,b)\}$ is given in this case by:

$$p^*_n(i,b) = \begin{cases} \frac{1}{\alpha}\left(\sqrt{\beta X'_n(b)i} - \beta i\right) & i < \frac{X'_n(b)}{\beta} \\ 0 & i \geq \frac{X'_n(b)}{\beta} \end{cases} \quad (29)$$

where the $X'_n(b)$'s are calculated recursively (backwards—from N to 1) as follows:

$$X'_n(Q) = \Phi\{X'_{n+1}(Q), Y'_{n+1}(Q)\} - \Phi\{X'_{n+1}(Q-1), Y'_{n+1}(Q-1)\} \quad (30)$$

$$Y'_n(Q) = B(Q) + \lambda L + \Phi\{X'_{n+1}(Q), Y'_{n+1}(Q)\} \quad (31)$$

$$X'_n(b) = \quad (32)$$
$$\lambda\Phi\{X'_{n+1}(b+1), Y'_{n+1}(b+1), Y'_{n+1}(b-1)\} - \lambda\Phi\{X'_{n+1}(b), Y'_{n+1}(b)\} + $$
$$(1-\lambda)\Phi\{X'_{n+1}(b), Y'_{n+1}(b)\} - (1-\lambda)\Phi\{X'_{n+1}(b-1), Y'_{n+1}(b-1)\}$$

$$Y'_n(b) = \lambda B(b+1) + \lambda\Phi\{X'_{n+1}(b+1), Y'_{n+1}(b+1)\}) + \quad (33)$$
$$(1-\lambda)B(b) + (1-\lambda)\Phi\{X'_{n+1}(b), Y'_{n+1}(b)\}$$

$$X'_n(0) = \lambda[\Phi\{X'_{n+1}(1), Y'_{n+1}(1)\} - \Phi\{X'_{n+1}(0), Y'_{n+1}(0)\}] \quad (34)$$

$$Y'_n(0) = \lambda B(1) + (1-\lambda)[B(0) + \Phi\{X'_{n+1}(0), Y'_{n+1}(0)\}] \quad (35)$$

for $n \in \{N, N-1, N-2, \ldots 3, 2, 1\}$, starting with $X_N(b) = T(b) - T(b-1)$ and $Y_N(b) = B(b) + T(b)$.

Remarks: The functional form of the optimal power control (29) in this case is identical to the (13) and (6) before. Only the X-parameter changes, which reflect the backlog-sensitivity of the power control and incorporates the additional aspects (arrivals with probability $\lambda$ and loss cost L).

C. Finite Power Ceiling

In the discussions above, we have always assumed that the power is unconstrained, that is, $p \in [0, \infty)$ in order to simplify the presentation. In practice, however, there is a maximum power that the transmitter can transmit at, which we call power ceiling and denote by $P_{max} < \infty$. Fortunately, very little changes in this case and the results carry over naturally. The minimization (9) in Lemma 1 is now over $p \in [0, P_{max}]$ and the optimal power function (6) changes slightly to $$p^*(i) = \begin{cases} \min\left\{\frac{1}{\alpha}\left(\sqrt{\beta Xi} - \beta i\right), P_{max}\right\}, & i < \frac{X}{\beta} \\ 0, & i \geq \frac{X}{\beta}, \end{cases} \quad (36)$$

that is, it is clipped at $P_{max}$. This affects $\Phi(X,Y)$, which must be recomputed now. The $X_n, Y_n$ and $X'_n, Y'_n$, are now computed in exactly the same way as before, but using the new formula for $\Phi$.

D. General Packet Success Probability

In Lemma 1, we assumed that the probability of success for packet transmission is of the form $$s(p,i) = \frac{p}{\alpha p + \beta i} = \frac{(p/i)}{\alpha(p/i) + \beta},$$

the $$\frac{p}{i}$$

being the SIR. Lemma 1, and all its results, can be easily generalized to $s(p,i) = g(p/i)$, where $g(x) \in [0,1]$ is an increasing differentiable function, as is naturally the case in communication systems.

Then it is easy to see that the basic functional inf $$_p\int_0^I \left\{p - g\left(\frac{p}{i}\right)X + Y\right\}f(i)\,di$$

is minimized for $p^*(i)$ which satisfies the equation $$\left.\frac{dg}{dx}\right|_*^p = \frac{i}{X}. \quad (37)$$

Indeed, this minimizes the expression $$p - g\left(\frac{p}{i}\right)X + Y$$

for every fixed i, X, Y. The specific distribution f(i) does not play a role here. Of particular interest is the function $$s(p,i) = 1 - e^{\delta\left(\frac{p}{i}\right)} \quad (38)$$

which appears in certain communication technologies [6]. In this case, the optimal power control function $p^*(i)$, minimizing the function $$\Psi\{X, Y\} = \inf_{p \in [0, P_{\max}]} \int_0^I \{p - (1 - e^{\delta(\frac{p}{i})})X + Y\} f(i) di, \quad (39)$$

Figure 3:
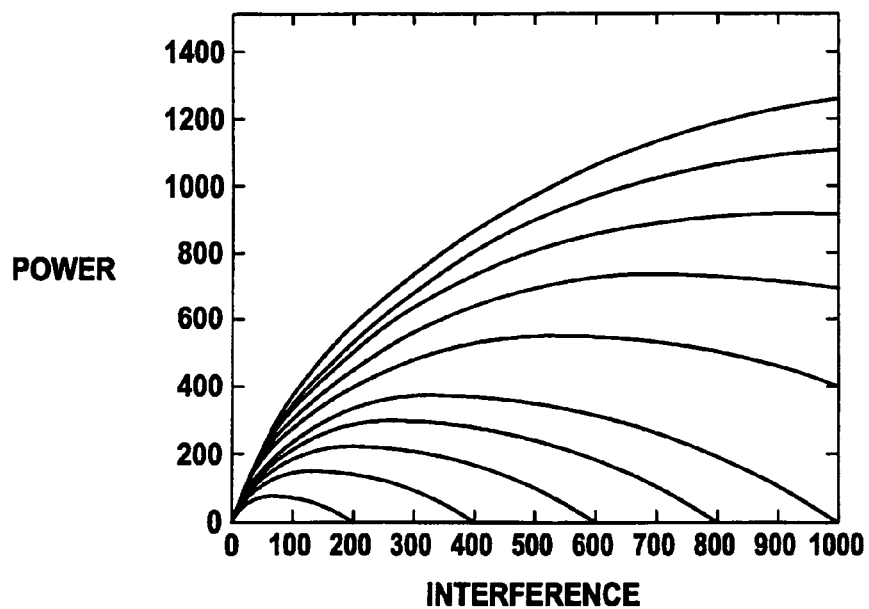
FIG. 3 shows plots of the power function $$p^*(i) = -i \log\left(\frac{i}{X}\right)$$

$(X \geq Y \geq 0)$ is simply $$p^*(i) = \begin{cases} \min\{-\frac{i}{\delta}\log\frac{i}{\delta X}, P_{\max}\}, & i < \delta X \\ 0, & i \geq \delta X, \end{cases} \quad (40)$$

irrespectively of the distribution density f(i). Of course, the latter does affect the actual minimal value of ψ(X,Y) which is ultimately used to compute the dependence of X on the backlog b. Example: FIG. 3 shows the optimal power control curves $$p^*(i) = -i\log\left(\frac{i}{X}\right)$$

for various values of X. Note that the 'shape' and behavior of the power curves in FIG. 3 are very similar to those in FIG. 1. This structural property is used later as discussed below.

E. Markovian Interference

Up to now, we have assumed that the interference levels $i_n$ in different time slots are i.i.d. random variables, distributed with some general density f(i). However, the methodology and results presented above, extend naturally to the case of Markovian interference. Indeed, let there be a discrete finite set of interference states I and let $i_n$ be a time-homogeneous Markov chain with transition probabilities $P[i_{n+1}=j|i_n=i]=q_{ij}$ from state i∈I to j∈I. We assume that the Markov chain is irreducible and has a stationary distribution v(I) i∈I. We assume that arrival and transmission events are independent of the interference Markov chain. In this case, we can again analyze the system using the same dynamic programming methodology. Indeed, consider the dynamic formulation of section II-B and let $V_n(b,i)$, be the expected cost-to-go from state (b,i) at time n, that is, the minimal cost to be incurred under optimal power control, given that the system starts at time n from backlog state b and interference state i. The dynamic programming equation for every 0<b<Q and i∈I then becomes:

$$V_n(b, i) = \min\left\{p + \lambda\left[B(b+1) + (1 - s(p, i))\sum_{j \in I} q_{ij}V_{n+1}(b+1, j) + \right.\right.$$

$$s(p, i)\sum_{j \in I} q_{ij}V_{n+1}(b, j)\right] +$$

$$(1 - \lambda)\left[B(b) + (1 - s(p, i))\sum_{j \in I} q_{ij}V_{n+1}(b, j) + \right.$$

$$\left.\left. s(p, i)\sum_{j \in I} q_{ij}V_{n+1}(b-1, j)\right]\right\} \quad (41)$$

and by rearranging the terms $$V_n(b, i) = \min_p \{p - \vartheta(p, i)X_n(b, i) + Y_n(b, i)\} \text{ with} \quad (42)$$

$$X_n(b, i) = \sum_{j \in I} q_{ij}\{\lambda[V_{n+1}(b+1, j) - V_{n+1}(b, j)] + \quad (43)$$

$$(1 - \lambda)[V_{n+1}(b, j) - V_{n-1}(b-1, j)]\} \text{ and}$$

$$Y_n(b, i) = \quad (44)$$

$$\sum_{j \in I} q_{ij}\{\lambda[B(b+1) + \lambda V_{n+1}(b+1, j)](1 - \lambda)[B(b) + V_{n+1}(b, j)]\}.$$

Moreover, for the boundary cases b=0 and b=Q we need to write special equations, analogous to those in section II-B. We omit them here in the interest of space, especially since they have similar functional forms as the ones above.

For $$s(p, i) = \frac{p}{\alpha p + \beta i},$$

equation (42) is covered by Lemma 1, an the optimal power control turns out to be again $$p_n^*(i, b) = \begin{cases} \frac{1}{\alpha}(\sqrt{\beta X_n(b, i)i} - \beta i) & i < \frac{X_n(b, i)}{\beta} \\ 0 & i \geq \frac{X_n'(b)}{\beta}, \end{cases} \quad (45)$$

where the $X_n(b,i)$'s are computed again using the corresponding recursive relations. For other s(p,i)'s the system is treated similarly.

F. Incorporating Packet Deadlines

Finally, another interesting formulation of the power control problem can be obtained by introducing deadlines associated with the packets. Each one has to be successfully transmitted by a deadline after its arrival; otherwise, it expires and gets dropped from the buffer, while a cost is incurred by the system. The problem is precisely formulated as follows.

Assume that each packet has a deadline of D time slots after its arrival, by which it has to be transmitted before it expires and is eliminated from the queue. When a packet expires a cost E is incurred. Again we assume that the buffer has capacity Q, as in section (II-B). The queue state of the system at time n is the Q-dimensional vector $$R_n = (r_n^1, r_n^2, r_n^3, \ldots r_n^k, \ldots r_n^Q) \quad (46)$$

where $$r_n^k$$

is the residual lifetime of the packet at the $k^{th}$ position of the queue at time n. Since the queue is FIFO, we must have $$r_n^1 < r_n^2 < r_n^3 < \ldots < r_n^k < \ldots < r_n^Q.$$

Given that the backlog of the queue at time n is $b_n$, we assign $$r_n^k = \infty$$

for every $k \in \{b_n+1, \ldots Q\}$, by convention. That is, we artificially assign infinite residual lifetime $r^k = \infty$ to buffer positions k that currently hold no packet. Note that since each packet can stay in the queue for at most D time slots, there will never be more than D packets in the queue even if the buffer has capacity Q>D. If Q≦D, however, the buffer can have up to Q packets.

The complete state of the system at time n is $(R_n, i_n)$, which has Markovian dynamics. It is easy to compute the transition probabilities. For example, transitions of the type $(R;i)=(r^1, r^2, r^3, \ldots r^k, \ldots r^b, \infty, \infty, \ldots \infty; i) \rightarrow (R';j) = (r^1-1, r^2-1, r^3-1, \ldots r^k-1, \ldots r^b-1, D, \infty, \infty, \ldots \infty; j)$, correspond to a packet arriving, none expiring (hence, $r^1 > 0$), none getting successfully transmitted, and the interference switching from i to j. The probability of such transitions are $\lambda(1-s(p,i)q_{ij})$. Similarly, transition f of the type $(R;i)=(r^1, r^2, r^3, \ldots r^k, \ldots r^b, \infty, \infty, \ldots \infty; i) \rightarrow (R';j)=(r^2-1, r^3-1, \ldots r^k-1, \ldots r^b-1, D, \infty, \infty, \ldots \infty; j)$, Correspond to a packet arriving, none expiring ($r^1 > 0$), one being successfully transmitted, and the interference switching from i to j. The probability of such transitions are $\lambda s(p,i) q_{ij}$. In the same way, it is easy to identify all possible transitions $(R;i) \rightarrow (R';j)$ and the corresponding probabilities, which turn out to be of the general form $\epsilon_{RR'}(p,i)q_{ij}$. Given that the system is in state (R;i), we can easily compute the cost C(p, R,i) incurred in the current time slot. Letting $U_n(R,i)$ be the cost-to-go, the dynamic programming recursion then becomes $V_n(R,i) = \min_p \{C(p,R) + \Sigma_{R'} \epsilon_{RR'} \Sigma_j q_{ij} V_{n+1}(R';j).\}$ It turns out that due to the nature of the cost C(p,R,i), Lemma 1 applies again and we obtain an optimal power control similar in functional form to that in (45). We omit the details, to be included in the journal version of this paper, but the method and process should be already clear.

III. Design and Evaluation of PCMA Algorithms

In the previous section, we have analyzed the case of a single power controlled link, operating in an environment of random interference which is unresponsive to its actions. Of great interest, of course, is the case of multiple interfering links operating in a common, shared radio channel. From each individual link's perspective all the others can be treated as a random interference environment. The big difference, however, is that this environment is now responsive to the link transmitter's actions. Indeed, the link increasing its power raises the interference on other links, which may in turn increase their powers in response and hence cause an increase in interference on the original link.

We aim to design power control algorithms for efficient channel sharing, that is, to maximize the aggregate effective throughput of the channel, to minimize the power used to support a certain required quality of service (QoS) for its users, maximize the channel capacity in terms of number of supported users at a fixed QoS etc. Such algorithms should be simple, distributed, autonomous (and possibly asynchronous) in order to scale well in large wireless network architectures.

Consider a radio channel and a number of communication links in it, operating in slotted time. Each link can only observe the past and present states of its queue backlog, transmitted power and collective (aggregate) interference, induced on it by all other transmitters sharing the channel. Based on this information, it needs to decide what power to transmit at in the next time slot. That is, each transmitter uses exclusively locally observed information to autonomously control its transmitted power. Let $b_n$ be the transmitter queue backlog in the $n^{th}$ time slot, $i_n$ the interference observed during that slot at the receiver of the communication link, and $p_n$ the power transmitted in the slot. We assume that the slot is defined by the time needed to transmit a packet (or bit or any information unit). The receiver communicates interference measurements (and ACKs/NACKs) to the transmitter typically on a low-rate reliable reverse channel, which is perhaps a separate control channel. Let G be the power gain from the transmitter to the receiver of the link.

We first consider a simple distributed algorithm for PCMA, which is based on the idea of attempting to transmit each packet at a constant SIR, shooting for a fixed probability of success in the process. Let $\gamma^t$ be the target SIR the link needs to maintain and $$\gamma_n = \frac{Gp_n}{i_n}$$

the SIR observed during the $n^{th}$ time slot. The power control algorithm is simply:

Constant-SIR Algorithm: (standard benchmark)

$$p_{n+1} = \begin{cases} \frac{\gamma^t}{G} i_n = \frac{\gamma^t}{\gamma^n} p_n & b_n > 0 \\ 0 & b_n = 0, \end{cases} \quad (47)$$

that is, each link in the channel updates its power autonomously, according to the above scheme, in consecutive time slots.

Note that the link increases its power in the next time slot, if the SIR it observed in the current one was below the target $\gamma^t$ and decreases it otherwise. Therefore, it always tries to achieve a constant SIR $\gamma^t$ and a corresponding constant transmission success probability, when it has a packet to transmit. The algorithm is obviously distributed and autonomous, since it uses only local information. We call the above algorithm standard and use it as a benchmark for our performance studies below, comparing it to others introduced later.

The standard algorithm above is essentially an extension of the basic power control algorithm initially introduced by Foschini & Miljanic [1] for voice-oriented continuous traffic in wireless networks. This has been extensively studied and shown to have several optimality properties for continuous traffic. The scheme (47) extends it to data traffic, given the previous formulation of the problem. Because of its importance in the literature of power control for continuous traffic, it naturally provides the benchmark of the study of PCMA algorithms for packetized data traffic in this paper.

We introduce below a new family of algorithms, motivated by the power control problem formulation and structural analysis of section II. Indeed, we have seen that the functional form of the optimal power control is ubiquitous in several dynamic programming formulations of the previous section. This leads us to introduce the following two new classes of algorithms. For a success probability of the form ($\alpha \geq 1$, $\beta > 0$):

$$s(p, i) = \frac{p}{\alpha p + \beta i} = \frac{\frac{p}{i}}{\alpha \frac{p}{i} + \beta} \quad (48)$$

the power control algorithm is:

PCMA-1 Algorithms: Each link in the channel updates its power according to the following scheme in consecutive time slots:

$$p_{n+1} = \begin{cases} \frac{1}{\alpha}(\sqrt{\beta X(b_n) i_n} - \beta i_n), & i_n < \frac{X(b_n)}{\beta} \\ 0, & i_n \geq \frac{X(b_n)}{\beta}, \end{cases} \quad (49)$$

where X(b) is an increasing function of the transmitter queue backlog. Particular selections generates a family of algorithms.

Note that the PCMA-1 algorithms are trying to shoot for a variable SIR target.

$$\gamma_1^t(b, i) = \begin{cases} \frac{1}{\alpha}\left(\sqrt{\beta \frac{X(b)}{i}} - \beta\right), & i < \frac{X(b)}{\beta} \\ 0, & i \geq \frac{X(b)}{\beta}, \end{cases} \quad (50)$$

assuming that the backlog and observed interference would not change in the following time slot because of an arrival or power updates of the other transmitters. Substituting into (48), we get a variable success probability $$a_1(b, i) = \begin{cases} \frac{1}{\alpha}\left(1 - \sqrt{\frac{\beta i}{X(b)}}\right), & i < \frac{X(b)}{\beta} \\ 0, & i \geq \frac{X(b)}{\beta}, \end{cases} \quad (51)$$

which is sensitive to both backlog and interference.

A second case is that where the probability of successful transmission has the function form $$s(p, i) = 1 - e^{\delta\left(\frac{p}{i}\right)}. \quad (52)$$

This generates another family of power control algorithms as follows:

PCMA-2 Algorithms: Each link in the channel updates its power according to the following scheme in consecutive time slots:

$$p_{n+1} = \begin{cases} -\frac{i_n}{\delta}\log\left(\frac{i_n}{\delta X(b_n)}\right), & i_n < \delta X(b_n) \\ 0, & i_n \geq \delta X(b_n), \end{cases} \quad (53)$$

where X(b) is an increasing function of the transmitter queue backlog. Its particular selection generates a family of algorithms:

Note that under PCMA-2 each transmitter is shooting for the variable SIR target $$\gamma^t(b, i) = \begin{cases} -\frac{1}{\delta}\log\frac{\delta}{\delta X(b)}, & i < \delta X(b) \\ 0, & i \geq \delta X(b), \end{cases} \quad (54)$$

when its backlog is b and the interference is i, hoping that those will not change in the next time slot. That way, it shoots for a probability of success $$s_2(b, i) = \begin{cases} 1 - \frac{\delta}{\delta X(b)}, & i < \delta X(b) \\ 0, & i \geq \delta X(b), \end{cases} \quad (55)$$

which is again backlog and interference sensitive. We explore these two families of power control algorithms below and compare their performance to the constant-SIR one.

Remark: Constrained Power. When there is a power ceiling $P_{max}$ that the power cannot exceed, both PCMA-1 and PCMA-2 families of algorithms should clip the power at $P_{max}$ (when it would have otherwise exceeded it).

Remark: Aggressive, Soft-Backoff, and Hard-Backoff phases of PCMA-1 and PCMA-2: By looking at FIG. 1 and FIG. 3, we see that although PCMA-1 and PCMA-2 have different detailed functional forms, they basically have the same general behavior, which is characterized as follows: Given any fixed backlog b, both algorithms generally have three operational phases that they go through as the interference increases. First, they aggressively try to match and overcome the interference by increasing the power (aggressive phase). Second, as the interference increases beyond some point (different for each algorithm) they start lowering the power, going into a soft-backoff mode, until the transmitted power hits 0 and stays there—then, they go into a hard-backoff mode, as the interference increases further. The intuitive explanation is that, under high interference, there is no point in trying to transmit and spend power, since the chances of being successful drop; therefore, one it is better to back off and wait until the interference subsides. Backing off causes arriving packets to start accumulating in the buffer. That, in turn, raises X(b) and causes the aggressive zone as well as the soft backoff one to spread out in both the PCMA-1 and PCMA-2, which now becomes more aggressive overall (as X(b) increases). This causes packets to be successfully transmitted, which lowers the backlog and deflates X(b) again. This adapted behavior is common to both algorithms and lies at the core of their operation.

To evaluate PCMA-1 and PCMA-2 and compare them to Constant-SIR, we have simulated all three on a sample network which has the following structure. It is a 4×4 square lattice of 16 square cells, with its edges wrapped around to generate a 4×4 torus (in order to avoid any boundary effects). Each square cell has a communication link (16 total). Let $G_{ij}$ be the power gain between the transmitter of the $j^{th}$ link and the receiver of the $i^{th}$ one. We normalize all $G_{ii}=1$ and use $G_{ij}=2/r_{ij}^2$, where rij is the distance between the transmitter of the $j^{th}$ link and the receiver of the $i^{th}$ one. Links are positioned at the centers of the squared cells with a distance between neighbors of size 4. The thermal (ambient) noise is taken to be 1. Time is slotted and the three power control algorithms are simulated on the network.

The probability of success used for all three power control algorithms is that of (48) with $\alpha=\beta=1$ (even for PCMA-2). The function X(b)=4+b is used for both PCMA-1 and PCMA-2. The constant 4 is used to keep an acceptable throughput for very small backlogs, so as to suppress excessive delays at very low arrival rates.

FIG. 4 shows the backlog vs. load performance curves of the three algorithms: Constant-SIR, PCMA-1, PCMA-2. It is interesting to observe that Constant-SIR power control can keep the backlog from exploding up to load 0.4 (approx.), while PCMA-1 and PCMA-2 can keep the queue stable up to packet arrival rates 0.5 (approx.). This is a substantial improvement in throughput of about 20%. It is also interesting that both PCMA-1 and PCMA-2 achieve almost the same throughput. This may be due to the similar adapted behavior of both algorithms.

It is interesting to intuitively attempt to explain the above observed behavior. Basically, as the load increases and the transmitters have—most of the time—packets to transmit, the Constant-SIR Algorithm becomes overly aggressive trying to keep a certain SIR. This raises the overall level of interference in the network, which in turn causes the transmitters to increase even further their powers and so on . . . . That way the backlog eventually explodes. Instead, PCMA-1 and PCMA-2—because of their soft and hard backoff capability and adaptive behavior to interference and backlog—do not fall into this trap and utilize the channel better, achieving a higher throughput. If, however, Constant SIR algorithm was willing to adaptively lower temporarily its SIR requirement, when facing congestion and backlog stress, it would be able to trade additional throughput for reduction in other performance parameters. This is a tradeoff that occurs in Adaptive SIR algorithms (which is what PCMA-1 and PCMA-2 basically are).

Finally, by choosing different functions X(b) for PCMA-1 and PCMA-2, say, different p's in $X(b)=b^p$, we can make the algorithms more backlog sensitive vs. power sensitive for a given load. That is by increasing p we can trade off lower backlog for higher average power, at a constant arrival rate (load).

REFERENCES INCORPORATED HEREIN

[1] G. J. Foschini and Z. Miljanic. A simple distributed autonomous power control algorithm and its convergence. IEEE Tran. On Veh. Tech., 42(4):641-646, 1993.
[2] J. Zander. Distributed cochannel interference control in cellular radio systems. IEEE Tran. Veh. Tech. 41(3):305-311, 1992.
[3] N. Bambos, S. C. Chen, and G. J. Pottie. Radio link admission algorithms for wireless networks with power control and active link quality protection. Proceedings of IEEE INFOCOM '95, Boston, Mass., 1995. Extended version: Technical Report #UCLA-ENG-94-25, School of Engineering & Applied Science, University of California at Los Angeles, March 1994.
[4] D. Mitra. An asynchronous distributed algorithm for power control in cellular radio systems. Proc. of $4^{th}$ WINLAB Workshop, Rutgers University, NJ 1993.
[5] D. Bertsekas. Dynamic Programming. Prentice. 1987.
[6] J. Rulnick, N. Bambos. Mobile Power Management for Wireless Communication Networks. Wireless Networks, v. 3, 1997.
[7] M. Andersin, Rosberg, J. Zander. Gradual removals in cellular PCS with constrained power control and noise. Wireless Networks, 2(1):27-43, 1996.
[8] M. Andersin, Z. Rosberg, J. Zander (1995). Soft and safe admission control in cellular networks. IEEE/ACM Transactions in Networking, 5(2):255-265, 1997.
[9] N. Bambos (1998). Toward Power-Sensitive Network Architectures in Wireless Communications: Concepts, Issues and Design Aspecxts. IEEE Personal Communications Magazine, 5(3):50-59, 1998.
[10] S. Hanly (1996). Capacity and power control in a spread spectrum macro diversity radio networks. IEEE Tran. On Comm., 44:247-256, 1996.
[11] R. Yates, C. Y. Huang. Integrated power control and base station assignment. IEEE Tran. Vehic. Tech., 44(3):638-644, 1995.
[12] R. Yates. A framework for uplink power control in cellular radio systems. IEEEJ. Sel. Areas in Comm., 13(7): 1341-1347 (1995).

Also incorporated herein (originally part of this instant patent document) are Appendix A and Appendix B respectively corresponding to two types of example implementations embodying the present invention. Appendix A, entitled "Power Controlled Multiple Access (PCMA) in Wireless Communication Networks," comprising 10 pages and authored by Nicholas Bambos and Sunil Kandukuri. Appendix B, entitled "Multimodal Dynamic Multiple Access (MDMA) in Power Controlled Wireless Packet Networks," comprising 11 pages and authored by Sunil Kandukuri and Nicholas Bambos.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes include, but are not necessarily limited to other network configurations and to other communication arrangements in which a common channel is breached by multiple transmitters. Such modifications and changes do not depart from the true spirit and scope of the present invention that is set forth in the following claims.

What is claimed is:

1. A method for managing a data transmission using a channel in a communication environment susceptible to interference due to another data transmission, comprising:
   providing an indication of recent state for the channel;
   buffering blocks of data for subsequent transmission;
   determining a buffered data backlog cost; and
   selecting a transmission mode for use in transmitting at least one of the buffered data blocks as a linear function of a number of buffered data blocks, a function of the buffered data backlog cost and the indication of the recent channel state.

2. The method of claim 1, wherein selecting a transmission mode includes selecting at least two of the following transmission modes: a power level, a modulation scheme, an access point, and a coding scheme.

3. The method of claim 1, wherein selecting a transmission mode as a function of the buffered data further includes selecting a transmission mode as a function of a number of buffered data blocks.

4. The method of claim 1, wherein selecting a transmission mode includes selecting a power level and at least one of the following transmission modes: a modulation scheme, an access point, and a coding scheme.

5. The method of claim 1, wherein the indication of the recent channel state corresponds to a recent indication of channel interference.

6. The method of claim 1, wherein the indication of the recent channel state corresponds to an indication of channel interference of the most recent transmission.

7. The method of claim 1, further including mitigating the interference due to another data transmission by assigning weighting factors to the buffered data blocks and collectively reducing the weighting factors.

8. The method of claim 7, further including assigning a cost to each of the buffered data blocks.

9. The method of claim 7, wherein collectively reducing the weighting factors includes controlling power levels for data transmission in consecutive time slots.

10. The method of claim 1, wherein the step of determining the buffered data backlog cost includes determining a number of buffered blocks of data for subsequent transmission.

11. The method of claim 10, wherein the step of the buffered data backlog cost includes a cost for buffer overrun.

12. The method of claim 10, wherein the step of determining the buffered data backlog cost includes a transmission deadline for at least one buffered block of data.

13. The method of claim 1, wherein the step selecting a transmission mode includes reducing the transmission power in response to channel interference of the most recent transmission exceeding a level.

14. A system for managing data transmissions wherein one channel is used in a communication environment susceptible to interference due to another data transmission, comprising:
means for providing an indication of recent state for the channel and determining a buffered data backlog cost;
means for buffering blocks of data for subsequent transmission; and
means for selecting a transmission mode for use in transmitting at least one of the buffered data blocks as a linear function of a number of buffered data blocks, a function of the buffered data backlog cost and the indication of the recent channel state.

15. A system for managing data transmissions wherein one channel is used in a communication environment susceptible to interference due to another data transmission, comprising:
a first data processing block adapted to provide an indication of recent state for the channel and determining a buffered data backlog cost;
a second data processing block adapted to buffer blocks of data for subsequent transmission; and
a third data processing block adapted to select a transmission mode for use in transmitting at least one of the buffered data blocks as a function of the buffered data backlog cost and the indication of the recent channel state and linear function of a number of buffered data blocks.

16. The system of claim 15, further including a transmitting station adapted to transmit the data in modulated wireless form.

17. The system of claim 15, further including a plurality of transmitting stations, each adapted to transmit the data in modulated wireless form using a common communication channel.

18. The system of claim 15, further including a plurality of transmitting stations, each adapted to transmit the data in modulated wireless form using a common communication channel, and wherein each of the plurality of transmitting stations includes a first data processing block, a second data processing block, and a third data processing block.

19. The system of claim 18, wherein each of the plurality of transmitting stations is programmed to execute each of the first data processing block, the second data processing block, and the third data processing block independent of each other of the plurality of transmitting stations.

20. The system of claim 15, wherein a transmission mode selection includes at least two of the following transmission modes selections: a power level, a modulation scheme, an access point, and a coding scheme.

21. The system of claim 15, wherein a transmission mode is selected as a function of a number of buffered data blocks.

22. The system of claim 15, wherein a power level and at least one of the following transmission modes are selected: a modulation scheme, an access point, and a coding scheme.

23. The system of claim 15, wherein the indication of the recent channel state corresponds to a recent indication of channel interference.

24. The system of claim 15, wherein the indication of the recent channel state corresponds to an indication of channel interference of the most recent transmission.

25. The system of claim 15, further including wherein the interference due to another data transmission is mitigated by assigning weighting factors to the buffered data blocks and collectively reducing the weighting factors.

26. The system of claim 25, further including a processing block adapted to assign a cost to each of the buffered data blocks.

27. The system of claim 25, wherein the weighting factors are collectively reduced by controlling power levels for data transmission in consecutive time slots.

28. The system of claim 25, wherein each of the data processing blocks is in a single base station adapted to transmit using a first channel.

29. The system of claim 28, further including additional base stations adapted to transmit using the same first channel.

30. The system of claim 29, wherein each of the additional base stations includes similarly arranged first, second and third data processing blocks.

31. The system of claim 15, wherein the buffered data backlog cost corresponds to a number of buffered blocks of data for subsequent transmission.

32. The system of claim 31, wherein the buffered data backlog cost includes a cost for buffer overrun.

33. The system of claim 31, wherein the buffered data backlog cost includes a transmission deadline for at least one buffered block of data.

* * * * *

UNITED STATES PATENT AND TRADEMARK OFFICE
CERTIFICATE OF CORRECTION

PATENT NO.       : 7,634,287 B1                                          Page 1 of 1
APPLICATION NO. : 10/011116
DATED            : December 15, 2009
INVENTOR(S)      : Bambos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this

Twenty-first Day of December, 2010

David J. Kappos
*Director of the United States Patent and Trademark Office*